United States Patent Office 3,641,023
Patented Feb. 8, 1972

3,641,023
7-TRIAZINYL-COUMARINS
Klaus-Dieter Bode, Leverkusen, and Carl-Wolfgang Schellhammer, Opladen, Germany, assignors to Farbenfabriken Bayer Aktiengesellschaft, Leverkusen, Germany
No Drawing. Filed Apr. 4, 1969, Ser. No. 813,707
Claims priority, application Germany, Apr. 11, 1968,
P 17 70 182.5
Int. Cl. C07d 7/28
U.S. Cl. 260—248 CS                                6 Claims

ABSTRACT OF THE DISCLOSURE 7-triazinyl-coumarin of the formula

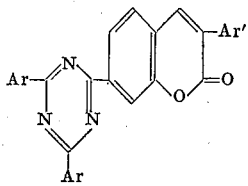

in which Ar and Ar' are identical or different, optionally substituted aromatic or hetero-aromatic radicals, and the coumarin ring may be further substituted, useful as brightening agents are disclosed. These compounds are prepared by reacting the corresponding coumarin-7-carboxylic acid chloride with Ar–CN in the presence of aluminum and ammonium chloride.

---

The object of the present invention relates to 7-triazinyl-coumarins of the general formula

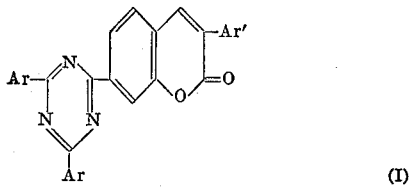

in which Ar and Ar' are identical or different, optionally substituted aromatic or hetero-aromatic radicals, and the coumarin ring may contain further substituents, as well to their production and use as brightening agents.

Suitable aromatic radicals Ar or Ar' are preferably phenyl radicals or naphthalene radicals which may contain substituents, such as alkyl groups with 1–4 carbon atoms, for example, methyl, ethyl, isopropyl or tertiary butyl groups: alkoxy groups with 1–4 carbon atoms, such as methoxy or ethoxy groups; halogen atoms, such as chlorine or bromine, as well as optionally substituted phenyl groups or cycloalkyl groups, such as cyclohexyl groups.

Suitable hetero-aromatic radicals Ar or Ar' are especially nitrogen-containing 5- or 6-membered, optionally further substituted radicals, such as thienyl, pyrazolyl, 1,2,4-triazolyl, 1,2,3-triazolyl, imidazolyl, triazinyl, benzimidazolyl, benzoxazolyl and pyridyl radicals; in the case of nitrogen-containing heterocycles the linkage with the coumarin or triazine ring may be effected via carbon or nitrogen.

Preferred compounds are those in which Ar stands for an optionally substituted phenyl radical, and Ar' stands for an optionally substituted phenyl, thienyl, pyrazolyl, 1,2,4-triazolyl, 1,2,3-triazolyl or imidazolyl radical. Preferred substituents in the phenyl radical are alkyl groups with 1–4 carbon atoms, or halogen atoms, such as chlorine and bromine.

Aromatic radicals Ar or Ar' to be mentioned are the following: phenyl, chlorophenyl, bromophenyl, tolyl, methoxyphenyl, ethoxyphenyl, naphthyl, chloronaphthyl, bromonaphthyl, biphenylyl, cyclohexylphenyl and dimethylphenyl.

Hetero-aromatic radicals Ar' are, in particular: thienyl, pyrazolyl, imidazolyl, triazolyl, pyridyl, benzoxazolyl, N-methyl-benzimidazolyl, diphenyl-triazinyl and furyl.

Hetero-aromatic radicals Ar to be mentioned are, in particular: pyridyl and benzoxazolyl.

The production of the coumarin compounds according to the invention can be carried out in known manner by reacting acid chlorides of the general Formula II in which Ar' has the same meaning as above, with nitriles of the Formula III in which Ar has the same meaning as above, and with ammonium chloride in the presence of aluminum chloride in suitable inert solvents, according to the following reaction equation:

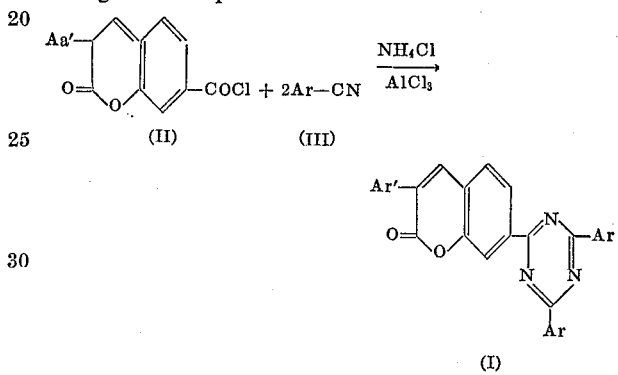

The individual reaction is carried out in such a way that the acid chloride is dissolved in the inert anhydrous medium and reacted with at least 2 mol aluminum chloride per mol acid chloride. When the exothermal reaction has subsided, heating is continued for some time at about 100–120° C., followed by the addition of at least 2 mol ammonium chloride per one mol acid chloride, and heating the mixture at about 100–140° C. for about 10–20 hours. After cooling, the reaction mixture is stirred into water, the organic phase separated and working up carried out in conventional manner.

The acid chlorides (II) serving as starting materials can be prepared in usual manner from the appropriate carboxylic acids, for example by heating with thionyl chloride. Suitable carboxylic acids are, for example, the following:

3-phenyl-coumarin-7-carboxylic acid,
3-p-tolyl-coumarin-7-carboxylic acid,
3-p-methoxyphenyl-coumarin-7-carboxylic acid,
3-(3',4'-dimethylphenyl)-coumarin-7-carboxylic acid,
3-(2-thienyl)-coumarin-7-carboxylic acid,
3-(1-pyrazolyl)-coumarin-7-carboxylic acid,
3-[1,2,4-triazolyl-(1)]-coumarin-7-carboxylic acid,
3-(1-imidazolyl)-coumarin-7-carboxylic acid,
3-[1,2,3-triazolyl-(1)]-coumarin-7-carboxylic acid,
3-(2-tetralinyl)-coumarin-7-carboxylic acid,
3-(4-pyridyl)-coumarin-7-carboxylic acid,
3-(3',4'-dichlorophenyl)-coumarin-7-carboxylic acid,
3-(4'-chlorophenyl)coumarin-7-carboxylic acid,
3-(2-benzoxazolyl)-coumarin-7-carboxylic acid,
3-(2-N-methylbenzimidazolyl)-coumarin-7-carboxylic acid, and
3-[4,6-diphenyltriazinyl-(2)]-coumarin-7-carboxylic acid.

The 3-aryl-coumarin-7-carboxylic acids are prepared by suspending the corresponding 7-amino-3-arylcoumarins in known manner at temperatures between 0 and 30° C. in acids, e.g. sulphuric acid, hydrochloric acid or phosphoric acid, and diazotising at temperatures between 0 and 20° C. with 1.0–1.3 mols of sodium nitrite or 1.0–1.3 mols of nitrosyl sulphuric acid per mol of amino coumarin. The diazonium salt thus obtained is poured onto ice and filtered off with suction to separate off excess acid. When using amino coumarins carrying heterocyclic substituents which are capable of salt formation, the acid must be separated off by pouring the diazonium salt into saturated sodium chloride solution. The suspension of the diazonium salt in water is added dropwise between 20 and 75° C. to a solution of 1–15 mols of copper (I)-cyanide and 1–15 mols of alkali metal cyanide in water and briefly heated. The resulting 7-cyano-3-aryl coumarins are hydrolized in known manner to yield carboxylic acids by heating in hydrochloric acid, sulphuric acid or phosphoric acid, preferably polyphosphoric acid, to temperatures of about 200° C.

Suitable arylnitriles (III) are the following, for example: benzonitrile, o-tolunitrile, m-tolunitrile, p-tolunitrile, o-chlorobenzonitrile, m-chlorobenzonitrile, p-chlorobenzonitrile, picolinic acid nitrile, nicotinic acid nitrile, isonicotinic acid nitrile and naphthonitrile.

Suitable inert solvents are, for example, chlorobenzene, o-dichlorobenzene, toluene, xylene, nitrobenzene, tetrachloroethane or nitromethane.

The new compounds (I) are valuable optical brightening agents. They can be added, for example, to spinning or casting compositions of polyester, polyamide, cellulose acetate, polypropylene, polyethylene and polyvinyl chloride, which are used for the production of synthetic filaments, fibres, foils or other products. The compounds of the general Formula I are also suitable for the optical brightening of polyester materials according to the thermosol process as well as for brightening lacquers based on cellulose acetate and nitrocellulose acetate. The brightening agents are used for this purpose in quantities of about 0.05 to 1 percent by weight.

Suitable compounds of the general Formula I are e.g. those compiled in the table below:

Compounds of the formula

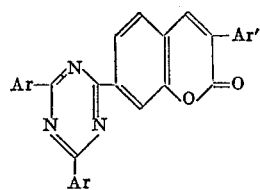

TABLE

| Ar | Ar' | Melting point, °C. |
| --- | --- | --- |
| Phenyl | Phenyl | 329–330 |
| p-Tolyl | do | 293–4 |
| m-Tolyl | do | 238.5–40 |
| o-Tolyl | do | 267 |
| p-Chlor | do | 288 |
| Phenyl | p-Tolyl | 281 |
| p-Tolyl | do | 324–6 |
| Phenyl | Pyrazolyl-1 | 282–4 |

The degrees given in the examples are degrees centigrade.

EXAMPLE 1

(1) Preparation of 3-p-phenyl-7-[4,6-diphenyl-triazinyl-(2)]-coumarin 14.2 g. 3-phenylcoumarin-7-carboxylic acid chloride are stirred in 200 ml. dry o-dichlorobenzene with 30.9 g. benzonitrile with the addition of 13.3 g. anhydrous aluminum chloride. When the heat evolution has subsided, the suspension is heated to 120° and stirred at this temperature for 15 hours after the addition of 10.6 g. ammonium chloride. After cooling, the mixture is poured into 2 litres of water and the precipitate liberated from o-dichlorbenzene with steam. Yield: 17.2 g. A sample, which is recrystallised from o-dichlorobenzene/tonsil, melts at 329–330°.

(2) Application (a) A fabric of fibres obtained from polyethylene glycol terephthalate is introduced, at a goods-to-liquor ratio 1:40, in a bath which contains, per litre, 1.5 g. oleyl sulphonate, 0.75 g. formic acid, 0.1 g. 3-p-phenyl-7-[4,6-diphenyl-triazinyl-(2)]-coumarin and 2 g. sodium chlorite; the bath is then heated to boiling within 30 minutes and kept at boiling temperature for about 45 minutes, while moderately moving the fabric. The fabric is subsequently rinsed and dried; it then shows a good brightening effect.

The 3-phenylcoumarin-7-carboxylic acid chloride of melting point 212° used as starting compound was prepared by heating under reflux 3-phenylcourmarin-7-carboxylic acid with thionyl chloride in the presence of some drops of dimethyl formamide. 3-phenylcoumarin-7-carboxylic acid is prepared by transforming 7-amino-3-phenylcoumarin into 7-cyano-3-phenylcoumarin and subsequent hydrolysis.

(b) 7-cyano-3-phenylcoumarin:

90 g. of 7-amino-3-phenylcoumarin are dissolved at room temperature in 1400 g. of sulphuric acid (60° Bé.) and 116 g. of nitrosyl sulphuric acid are dropwise added at 15–20° C. The suspension is stirred for a further 45 minutes and poured into 3.5 kg. of ice. The mixture is stirred until a homogeneous suspension results which is filtered through an acid-fast filter. The filter cake is washed with an ice-cold sodium chloride solution until substantially free from acid and suspended in 1 liter of ice water. The suspension is added with vigorous stirring to a 70° C. hot solution of 83 g. of copper-(I)-cyanide and 250 g. of potassium cyanide in 1.8 l. of water. After the evolution of nitrogen is finished the mixture is heated to 85–90° C. for a further 30 minutes and filtered off with suction after cooling. The brown filter cake is recrystallised from dimethyl formamide with the addition of active carbon.

Yield: 70.5 g. (72%). Melting point 280–282° C.

An analytical sample which is recrystallised once more melts at 284° C. and yields small colourless needles.

The following 7-cyano-3-aryl-coumarins are obtained in analogous manner:

| | Melting point, degrees |
| --- | --- |
| 7-cyano-3-p-tolylcoumarin | 286.5 |
| 7-cyano-3-p-anisylcoumarin | 271 |
| 7-cyano-3-pyrazolyl-1-coumarin | 237 |
| 7-cyano-3-(1,2,4-triazolyl-1)-coumarin | 262 |

(c) 3-phenylcoumarin-7-carboxylic acid:

172 g. of 7-cyano-3-phenylcoumarin are heated in 1700 g. of 76% polyphosphoric acid to 180° C. for 1 hour and then to 200° C. for a further hour. The dark solution is poured while hot into 4 l. of hot water and filtered off with suction. The residue is carefully washed with water and dried at 120° C. in a vacuum.

Yield: 118 g. (63%); melting point 311°.

An analytical sample shows a fixed melting point of 316° C. after recrystallisation from glycol monomethyl either acetate/active carbon.

The following 3-aryl-coumarin-7-carboxylic acids were prepared in analogous manner.

|  | Melting point, degrees |
|---|---|
| 3-p-tolylcoumarin-7-carboxylic acid | 326–27 |
| 3-p-anisylcoumarin-7-carboxylic acid | 288–90 |
| 3-pyrazolyl-1-coumarin-7-carboxylic acid | 297 |

(d) A fabric of fibres of aromatic polyesters is padded with an aqueous liquor which contains, for each litre, 1 g. of a commercial dispersing and wetting agent, 4 g. alginate thickening and 1 g. 3-phenyl-7-[4,6-diphenyl-triazinyl-(2)]-coumarin. The fabric is then squeezed out to a weight increase of 100%, dried and heated at 220° for 30 seconds. The fabric thus treated is subsequently washed hot and shows, in comparison with untreated material, a clear brightening effect. The 3-phenyl-7-[4,6-diphenyl-triazinyl-(2)]-coumarin used as brightening agent is prepared as described under (1).

EXAMPLE 2

(1) Preparation of 3-p-tolyl-7-[4,6-diphenyl-triazinyl-(2)]-coumarin 14.9 g. 3-p-tolyl-coumarin-7-carboxylic acid chloride are stirred in 200 ml. dry o-dichlorobenzene with 30.9 g. benzonitrile and mixed with 13.3 g. anhydrous aluminum chloride. When the evolution of heat has subsided, the mixture is heated to 120° and stirred, after the addition of 10.6 g. ammonium chloride, at the same temperature for 15 hours. After working up as described in the preceding example, 18 g. 3-p-tolyl-7-[4,6-diphenyl-triazinyl-(2)]-coumarin of melting point 281° (from o-dichlorobenzene) are obtained.

The 3-p-tolyl-coumarin-7-carboxylic acid chloride was prepared by heating under reflux 3-p-tolyl-coumarin-7-carboxylic acid with thionylchloride in the presence of some drops of dimethyl formamide. A sample, which is recrystallised from benzene/dioxan, melts at 197°.

(2) Application (a) A spinning solution prepared in conventional manner of 1 kg. cellulose acetate in 4 litres acetone is mixed with a solution of 1.5 g. 3-tolyl-7-[4,6-diphenyl-triazinyl-(2)]-coumarin in acetone and spun in known manner. The filaments obtained show a good light-fast brightening effect.

(b) 65 g. polyvinyl chloride of K-value 72–74, 35 g. dioctyl phthalate, 2 g. of a commercial tin-containing organic stabilizer, 1 g. titanium dioxide (rutile) and 0.1 g. 3 - p - tolyl - 7-[4,6-diphenyl-triazinyl-(2)]-coumarin are rolled on a heat-roller with slight friction at about 165–170° for 5 minutes; the resultant sheet is then drawn off on a four-roller calender to give a foil of 300μ. The foil has a good brightening effect.

(c) 1 g. 3 - p - tolyl - 7 - [4,6-diphenyl-triazinyl-(2)]-coumarin is dissolved in 1000 g. of a colourless lacquer of nitrocellulose or cellulose acetate. The lacquer is then thinyl brushed on to a colourless substrate. After drying, the lacquer is outstandingly brightened.

(d) A mixture of 100 g. polyester granulate obtained from terephthalic acid ethylene glycol polyester and 0.05 g. 3 - p - tolyl - 7-[4,6-diphenyl-triazinyl-(2)]-coumarin is heated to 285° and the melt spun to give filaments which show a very good brightening effect.

(e) A mixture of 100 g. polyamide and 0.05 g. 3-p-tolyl-7-(4,6-diphenyl-triazinyl-(2)]-coumarin is heated to 300° within 30 minutes and spun to filaments in usual manner. The material obtained in this way shows very good, light-fast brightening effects.

(f) A mixture of 100 g. polyproylene and 0.5 g. 3-p-tolyl-7-[4,6-diphenyl-triazinyl-(2)]-coumarin is heated to 280–290° and the melt spun in known manner to filaments which show good, light-fast brightening effects.

Similarly good brightening effects are achieved according to (a)–(f) with 3-pyrazolyl-(2)-7-[4,6-diphenyl-triazinyl-(2)]-coumarin of the formula

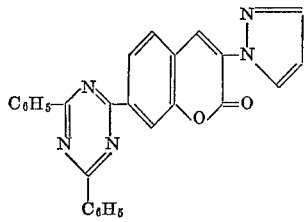

which is obtained by the following method:

13.7 g. 3 - pyrazolyl - (1) - coumarin - 7 - carboxylic acid chloride and 30.9 g. benzonitrile are stirred in 200 ml. o-dichlorobenzene with 13.7 g. anhydrous aluminium chloride. When the evolution of heat has subsided, the mixture is heated to 120° and, after the addition of 10.6 g. ammonium chloride, stirred at this temperature for 15 hours. After working up as described in Example 1, 13.2 g. of a pale yellow crystalline powder of melting point 284° are obtained.

The 3 - pyrazolyl - (1) - coumarin - 7 - carboxylic acid chloride was obtained by heating under reflux 3-pyrazolyl-(1)-coumarin - 7 - carboxylic acid with thionyl chloride in the presence of some drops of dimethyl formamide; melting point 203–205°. The 3-pyrazolyl-(1)-coumarin-7-carboxylic acid used as starting material can be prepared, for example, by condensing 4-carboxysalicyl aldehyde with pyrazolyl-(1)-acetic acid in the presence of sodium acetate and glacial acetic acid; melting point: 297°.

We claim:

1. The 7-triazinyl-coumarin compound of the formula

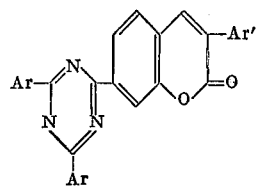

wherein Ar and Ar' are the same or different radicals and are phenyl; naphthyl; substituted phenyl or substituted naphthyl wherein said substituents are selected from alkyl groups with 1–4 carbon atoms, alkoxy groups with 1–4 carbon atoms, halogen, phenyl groups and cyclohexyl; or a heterocyclic radical selected from thienyl, pyrazolyl, 1,2,4-triazolyl, 1,2,3-triazolyl, imidazolyl, triazinyl, benzimidazolyl, benzoxazolyl and pyridyl radicals.

2. The compound of claim 1 wherein
   Ar is phenyl, chlorophenyl, bromophenyl or phenyl substituted with alkyl of 1–4 carbon atoms; and
   Ar' is phenyl, chlorophenyl, bromophenyl, phenyl substituted with alkyl of 1–4 carbon atoms, thienyl, pyrazolyl, 1,2,4-triazolyl, 1,2,3-triazolyl or imidazolyl.

3. The compound of claim 1 wherein Ar is phenyl and Ar' is phenyl.

4. The compound of claim 1 wherein Ar is phenyl and Ar' is p-tolyl.

5. The compound of claim 1 wherein Ar is p-tolyl and Ar' is p-tolyl.

6. The compound of claim 1 wherein Ar is phenyl and Ar' is pyrazolyl-1.

References Cited

UNITED STATES PATENTS 3,242,177   3/1966   Schellhammer et al.
                                              260—249.9 X JOHN M. FORD, Primary Examiner U.S. Cl. X.R.

252—301.2 W; 106—176; 117—33.5 T; 8—1 W

UNITED STATES PATENT OFFICE
CERTIFICATE OF CORRECTION

Patent No. 3,641,023 (SN 813,707)    Dated February 8, 1972

Inventor(s) KLAUS-DIETER BODE and CARL-WOLFGANG SCHELLHAMMER

It is certified that error appears in the above-identified patent and that said Letters Patent are hereby corrected as shown below:

| Column | Line | Error |
|---|---|---|
| 2 | Formula II | "Aa'[structure]" should be --Ar'[structure]-- |
| 4 | 15 | "in" should be -- into --. |
| 5 | 59 | "thinyl" should be -- thinly --. |
| 5 | 71 | "polyroylene" should be --polypropylene--. |
| 6 | Claim 1 structure | "[structure]" should be --[structure]-- |

Signed and sealed this 7th day of November 1972.

(SEAL)
Attest:

EDWARD M. FLETCHER, JR.                ROBERT GOTTSCHALK
Attesting Officer                      Commissioner of Patents